United States Patent [19]
Matsuura et al.

[11] Patent Number: 5,341,079
[45] Date of Patent: Aug. 23, 1994

[54] TRACKING CONTROL SYSTEM

[75] Inventors: Hitoshi Matsuura, Hachioji; Osamu Nakajima; Tetsuji Okamoto, both of Yamanashi, all of Japan

[73] Assignee: Fanuc Ltd., Minamitsuru, Japan

[21] Appl. No.: 949,830

[22] PCT Filed: Apr. 21, 1992

[86] PCT No.: PCT/JP92/00516
§ 371 Date: Dec. 4, 1992
§ 102(e) Date: Dec. 4, 1992

[87] PCT Pub. No.: WO92/19418
PCT Pub. Date: Nov. 12, 1992

[30] Foreign Application Priority Data
Apr. 26, 1991 [JP] Japan ................... 3-125149

[51] Int. Cl.⁵ .......................... G05D 23/275
[52] U.S. Cl. ............... 318/632; 318/568.19; 318/568.22; 318/570
[58] Field of Search ............ 318/632, 569, 599–601, 318/671, 567, 568.1, 568.11, 568.13–568.14, 568.19, 568.22, 568.24, 575–576, 560, 625, 646

[56] References Cited
U.S. PATENT DOCUMENTS
4,504,772 3/1985 Matsuura et al. ............ 318/603

FOREIGN PATENT DOCUMENTS
59-192446 10/1984 Japan .
3-2624 1/1991 Japan .
3-86446 4/1991 Japan .
3-86447 4/1991 Japan .
91/02624 3/1991 World Int. Prop. O. .
91/02625 3/1991 World Int. Prop. O. .

OTHER PUBLICATIONS
JP, 59–42254 (Fanuc Ltd.) Mar. 8, 1984.

Primary Examiner—William M. Shoop, Jr.
Assistant Examiner—David Martin
Attorney, Agent, or Firm—Staas & Halsey

[57] ABSTRACT

A tracing control system prevents a cutter head from biting into a workpiece at all times irrespective of a tracing speed. The cutter head moves to machine the workpiece based on displacements of a stylus on a tracer head (41) along respective axes. The tracer head (41) is actuated along tracing axes independently of the cutter head by motors (31) different from the cutter head. A calculating unit (6) calculates the actual position of the tracer head (41). Based on the actual position of the tracer head (41) and the displacements of the stylus along the respective axes, speed commands for the center of a cutter of the cutter head are corrected by a correcting unit (7) so as to correspond to the displacements of the stylus with respect to the tracer head (41). The central position of the cutter head is thus controlled at all times in conformity with the central position of the stylus.

5 Claims, 6 Drawing Sheets

TRACKING CONTROL SYSTEM

BACKGROUND OF THE INVENTION

1. Field of the Invention

The present invention relates to a tracing control system for machining a workpiece while tracing a model surface with a tracer head and, more particularly, to a tracing control system which reduces the extent to which the tracer head bites into the model surface.

2. State of the Relevant Art

Generally, to perform on-line tracing operation at high speed with high accuracy requires that a workpiece be simultaneously machined by a tracing control system.

Figure 6:
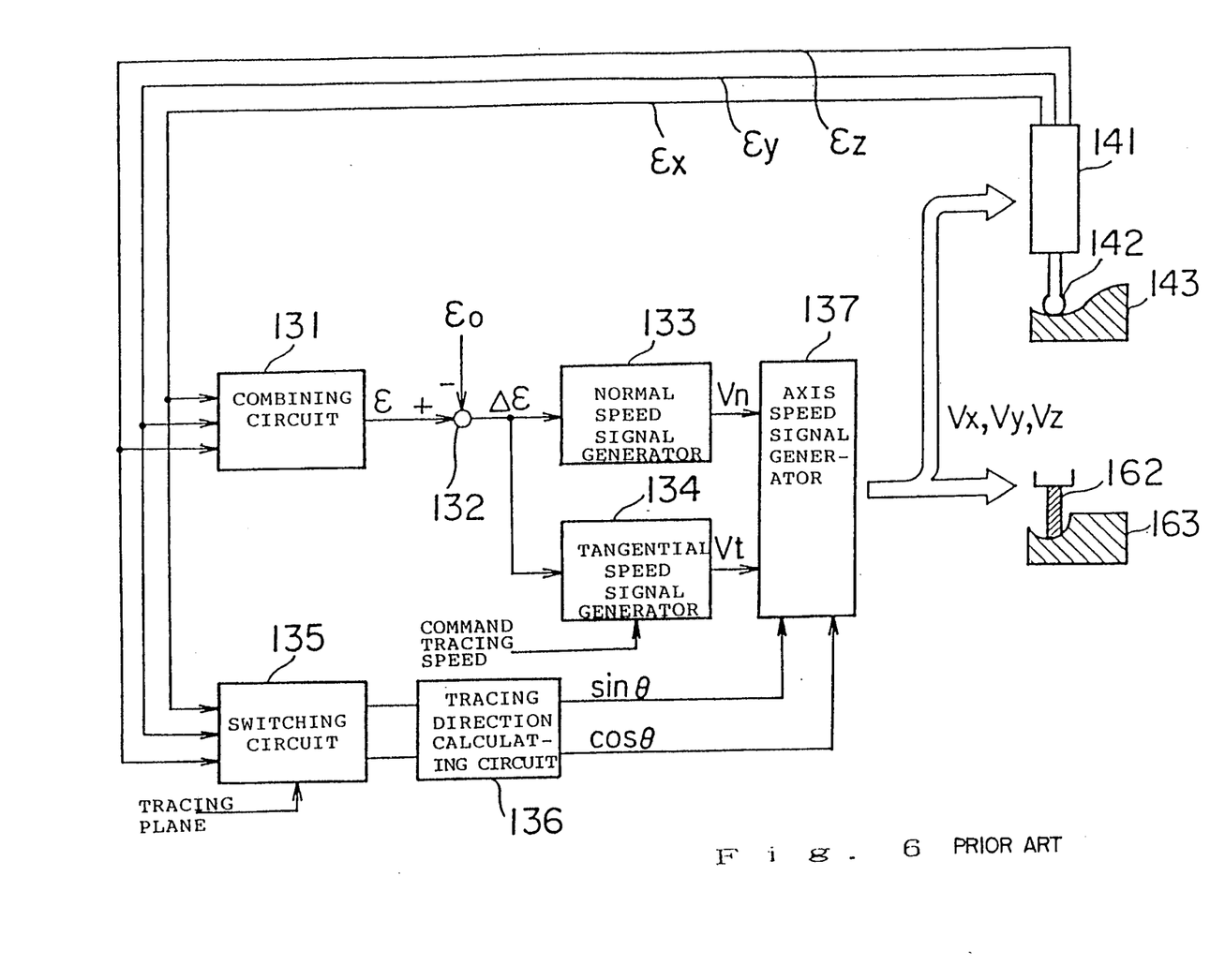
FIG. 6 is a block diagram of a conventional tracing control system.

FIG. 6 of the accompanying drawings schematically shows a conventional tracing control system. In FIG. 6, a stylus 142 of tracer head 141 moves in contact with an outer surface of a model 143, and displacements, $\epsilon x$, $\epsilon y$, $\epsilon z$ of the stylus 142 along these respective axes are detected by the tracer head 141. More specifically, the tracer head 141 detects displacements of the stylus 142 and generates corresponding displacement signals whose magnitudes correspond to the forces to which the stylus 142 is subjected, resulting from its contact with the model 143. A combining circuit 131 calculates the combined displacement $\epsilon$ of the stylus 142 according to an equation: $\epsilon = [(\epsilon x^2 + \epsilon y^2 + \epsilon z^2)^{\frac{1}{2}}]$. An adder 132 calculates the difference $\Delta\epsilon$ between the combined displacement $\epsilon$ and a reference displacement $\epsilon_0$. A normal speed signal generator 133 multiplies the difference $\Delta\epsilon$ by a predetermined gain to generate a normal speed signal Vn, i.e., a signal indicative of the speed in a normal direction. A tangential speed signal generator 134 generators a tangential speed signal Vt, i.e., a signal indicative of the speed in a tangential direction, from the difference $\Delta\epsilon$ and a command tracing speed.

A switching circuit 135 selects the displacements along the respective axes in a tracing plane that is commanded. A tracing direction calculating circuit 136 calculates the cosine ($\cos\theta$) and sine ($\sin\theta$) of a tracing direction, or angle $\theta$, at which the model 143 is traced, from the selected displacements. An axis speed signal generator 137 processes the signals Vn, Vt, $\cos\theta$, $\sin\theta$, generated from the displacement signals, into axis speed signals Vx, Vy, Vz for the corresponding tracing axis of the tracer head 141. The axis speed signals Vx, Vy, Vz are supplied to the tracer head 141 to move the stylus 142 on the surface of the model 143 and also to a cutter head 162 to move the cutter head 162 at the speeds represented by the axis speed signals Vx, Vy, Vz for thereby machining a workpiece 163.

In the conventional tracing control system which effects such a simultaneous machining process on the workpiece 163, the cutter head 162 and the tracer 141 are mechanically coupled to each other such that the relative positional relationship between the workpiece 163 and the cutter head 162 is controlled so as to be equal to the relative positional relationship between the model 143 and the tracer head 141. However, there is a certain limitation on the tracing speed of the tracer head 141, and if the tracing speed is excessively high, the cutter head 162 tends to bite into the workpiece 163 in a region where the profile of the model 143 abruptly changes.

The cutter head 162 is caused to bite into the workpiece 163 because the cutter head 162 and the tracer head 141 are in the same relative position, and when the stylus 142 overshoots beyond a reference distance with respect to the tracer head 141, the overshooting of the stylus 142 is reflected directly in the biting engagement of the cutter head 162 with the workpiece 163.

There has been developed a digitizer for solving the above problem. The digitizer reads, from time to time, the positions of a tracer head along the respective axes as digital positional data, and the model surface is linearly approximately based on the digital positional data. The positional data is processed to prevent a cutter head from biting into a workpiece, e.g., by temporarily interrupting the reading of positional data in a region where the profile of the model surface abruptly changes, thereby generating numerical control ("NC") data. The generated NC data is then applied to a computerized numerical control machine, which machines a workpiece with a cutter head.

Since the tracing process which uses the digitizer machines the workpiece after the model has been traced, however, the number of steps required is relatively large, and no efficient tracing operation can be effected.

The applicants have proposed in the application heil-219832 a tracing control system having a main motor for actuating a cutting machine as a whole, the main motor being driven in three axes of a first coordinate system. A tracer head is driven in three axes of a second coordinate system which, however, is associated with the respective three axes and coordinate system of the main motor. The driving of the tracer head is produced by an auxiliary motor. The main and auxiliary motors are controlled in relation to each other for reducing any biting engagement of a cutter head with a workpiece when it is machined simultaneously with the tracing of a model by the tracer head.

In the proposed tracing control system, the tracer head is moved ahead of the cutter head to prevent the cutter head from biting into the workpiece in a region where the profile of the model abruptly changes. As the speed of the racer head is reduced, the distance by which the tracer head moves ahead of the cutter head is also reduced, resulting in a corresponding reduction in the amount by which the cutter head bites into the workpiece. However, inasmuch as the distance, by which the tracer head moves ahead of the cutter head, is determined depending on the difference between delay time constants of the main and auxiliary motors, the tracing speed of the tracer head cannot be substantially increased. Furthermore, the amount by which the cutter head bites into the workpiece cannot be reduced beyond a certain limit, upon the occurrence of overshooting of the tracer head, because the displacements of the stylus along the respective axes cannot be increased beyond reference displacements.

SUMMARY OF THE INVENTION

In view of the aforesaid difficulties of the conventional tracing control system, it is an object of the present invention to provide a tracing control system for preventing a cutter head from biting into a workpiece at all times, irrespective of the tracing speed of a tracer head, by correcting the position of the cutter head using displacement signals from the tracer head based on the fact that the stylus of the tracer head does not bite into a model surface while tracing same.

According to the present invention, the above object can be accomplished by a tracing control system for detecting displacement signals, whose magnitudes correspond to forces applied to a stylus of a tracer head when the stylus contacts a model and based on displacements of the stylus along respective tracing axes, processing the displacement signals into speed signals for controlling movement of the tracer head along the tracing axes, and moving a cutter head to machine a workpiece based on the displacement signals, said tracing control system comprising calculating means for calculating an actual position of the tracer head, actuating means for actuating the tracer head along the tracing axes independently of movement of the cutter head, and correcting means for correcting speed commands for the center of a cutter of the cutter head, depending on the displacements of the stylus with respect to the tracer head, based on said actual position of the tracer head and the displacements of the stylus along the tracing axes.

The tracer head is actuated along the tracing axes independently of the cutter head by actuating means different from the actuating means for actuating the cutter head. Therefore, the central position of the cutter head is controlled at all times in conformity with the central position of the stylus.

DETAILED DESCRIPTION OF THE INVENTION

An embodiment of the present invention will hereinafter be described with reference to the drawings.

Figure 1:
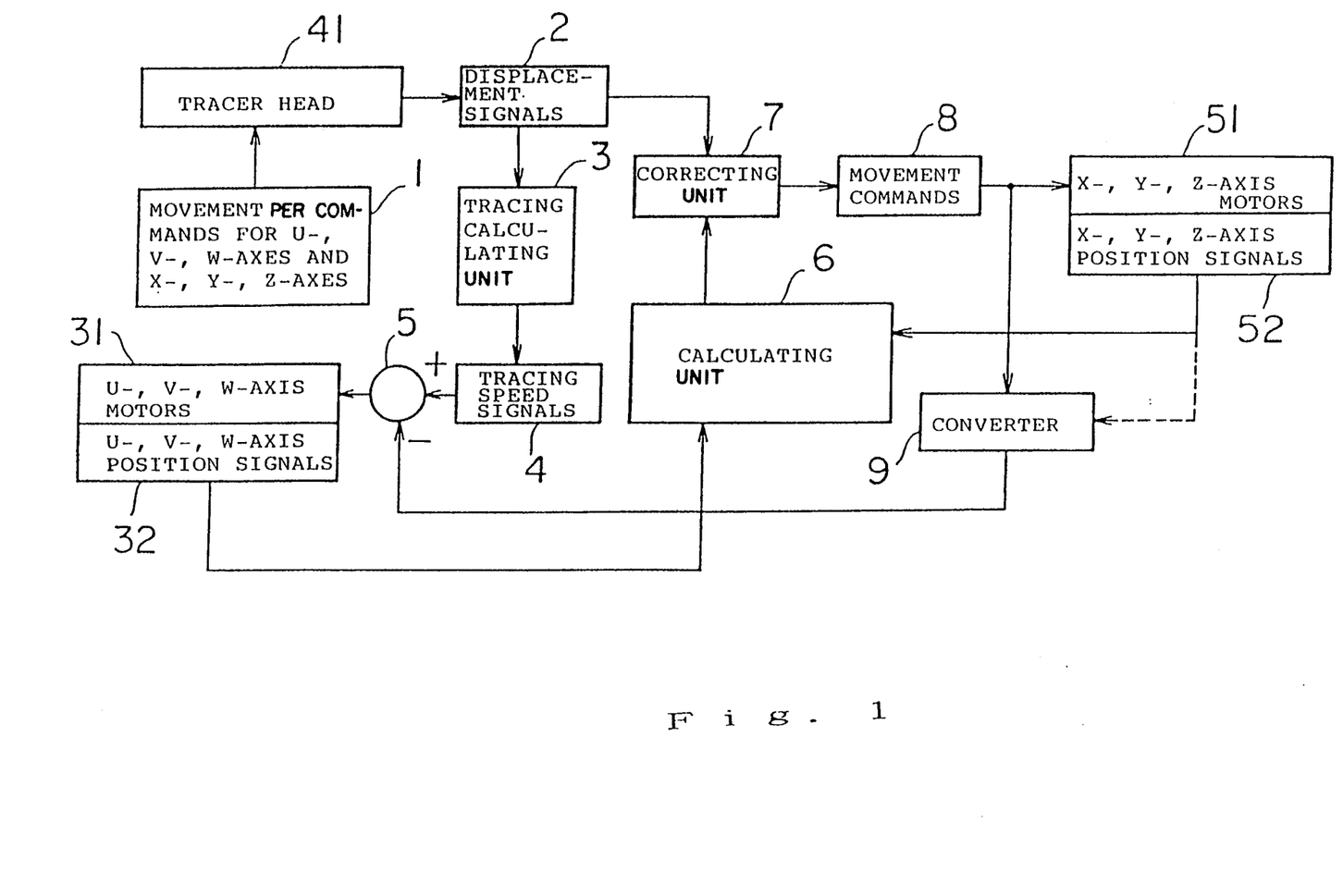
FIG. 1 is a block diagram of a tracing control system according to the present invention.

FIG. 1 shows, in block diagram form, a tracing control system according to the present invention. The tracing control system has a cutter head (not shown in FIG. 1, but driven by motors 51) and a tracer head 41 which is arranged in a tandem configuration with the cutter head. The cutter head, which is driven under tracing control, is movable selectively and three-dimensionally along X-, Y-, and Z-axes, and the tracer head 41 is movable selectively along tracing axes, i.e., U-, V-, and W-axes independently of, but relatively to the movement of the cutter head. The tracer head 41 is movable along the tracing axes by respective U-, V-, and W-axis motors 31, which cause the tracer head 41 to trace a model over corresponding distances, in addition to the distances by which the cutter head is moved with respect to a workpiece by X-, Y-, and Z-axis motors 51.

In the tandem-type tracing control system, the tracer head 41 is moved, depending on movement commands for the cutter head (X, Y, Z) and movement commands 1 for the tracer head (U, V, W). When a stylus of the tracer head 41 contacts the model, the tracer head 41 produces displacement signals 2 whose magnitudes correspond to the forces applied from the model to the stylus. The displacement signals 2 are processed by a tracing calculating unit 3 which generates axis speed signals 4 of the tracer head 41 along the respective axes. The tracing speed signals 4 are applied through an adder 5 to the U-, V-, and W-axis motors 31, whose respective displacement positions are detected as U-, V-, and W-axis position signals 32. A calculating unit 6 is supplied with the U-, V-, and W-axis positions signals 32, and the X-, Y-, and Z-axis position signals 52 of the cutter head which are derived from the X-, Y-, and Z-axis motor 51, and adds the supplied U-, V-, and W-axis position signals 32 and the X-, Y-, and Z-axis position signals 52, thereby calculating the actual position of the tracer head 41.

A correcting unit 7 adds the displacements of the stylus along the respective axes to the actual position of the tracer head 41 for thereby determining the central position of the stylus from the actual position of the tracer head 41. As a result of the displacement correction by the correcting unit 7, there is generated a speed command for the center of the cutter of the cutter head, the speed command corresponding to a relative displacement of the stylus with respect to the tracer head. Movement commands 8, based on the outputs of the correcting means 7, are given to the X-, Y-, and Z-axis motors 51. The control position of the cutter head thereby can be controlled into agreement with the control position of the stylus. Therefore, the cutter head is moved by the X-, Y-, and Z-axis motors 51 based on the displacement signals to prevent the cutter head from biting into the workpiece when the workpiece is machined by the cutter head.

A converter 9 serves to convert the corrected movement commands 8 into speed commands per unit calculation time. The speed commands are applied as negative input signals to the adder 5 which produces tracing commands independently of the central position of the cutter of the cutter head, thus determining movement commands for the U-, V-, and W-axis motors 31 that actuate the tracer head independently of the cutter head.

In FIG. 1, the converter 9 may be supplied with, rather than the movement commands 8, the axis position signals 52 of the cutter head which are indicative of the rotational positions of the X-, Y-, and Z-axis motors 51. The movement commands 8 or the axis position signals 52 may be selected, depending on the first order time delays of the X-, Y-, and Z-axis motors 51 and preset tracing speeds. It is also possible to correct the tracing commands for the tracer head 41 so that the tracing commands can correspond not only to the movement of the motors, but also to the actual movement of a reference element of the machine (e.g., in FIG. 3, movement of column 64 relative to table 53).

Figure 2:
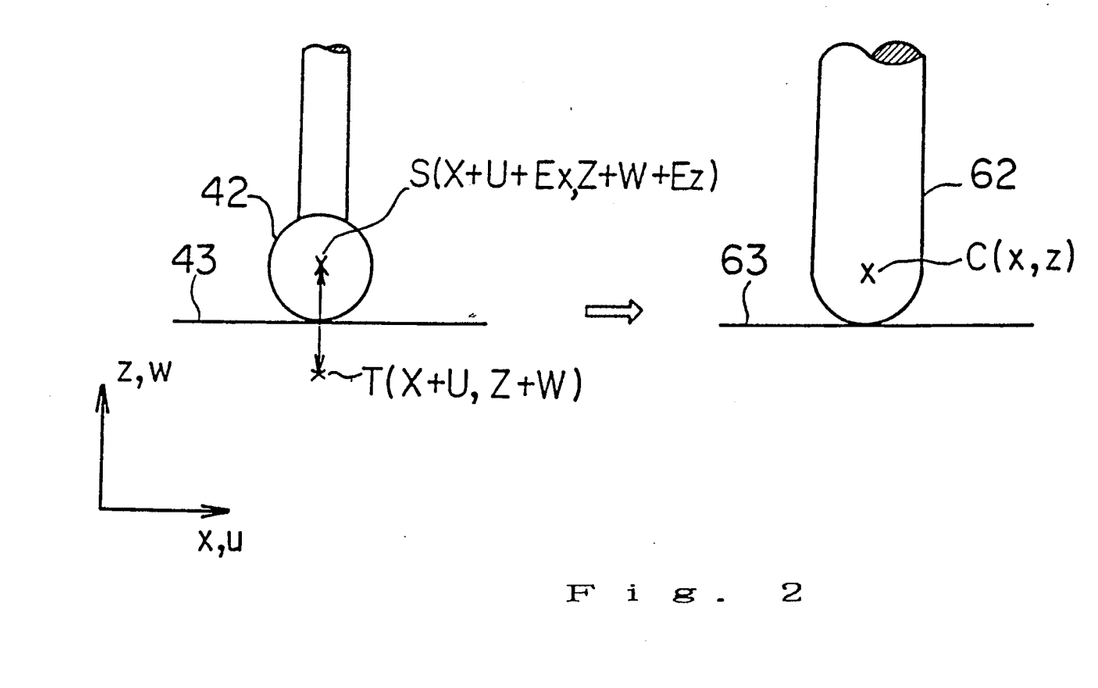
FIG. 2 is a diagram showing the positional relationship between a tracer head and a cutter head.

FIG. 2 shows the positional relationship between the tracer head and the cutter head.

The tracer head is actuated with its stylus 42 in contact with a model surface 43. Therefore, the position T of the tracer head is generally different from the central position S of the stylus 42. It is now assumed that the tracer head traces a surface in an X-Z plane.

The tracer head moves to a coordinate position T (X+U, Z+W) that is determined by tracing calculations. At this time, the position of the tracer head is calculated, based on signals from pulse coders associated with the U- and W-axis motors 31 and the X- and Z-axis motors 51. The central position S of the stylus 42 can be determined form coordinates X, U, Z, W along the X-, U-, Z-, and W-axes and relative displacements (Ex, Ez) of the stylus 42. When the difference between the central position S (X+U+Ex, Z+W+Ez) of the stylus 42 and the central position C (X, Z) of the cutter head 62 is given as a distance to be traversed by the X-, Z-axis motors 51, the position of a cutter head 62 with respect to a workpiece 63 can be controlled so as to be brought into agreement with the central position of the stylus 42 irrespective of the coordinate position T (X+U, Z+W) of the tracer head.

Figure 3:
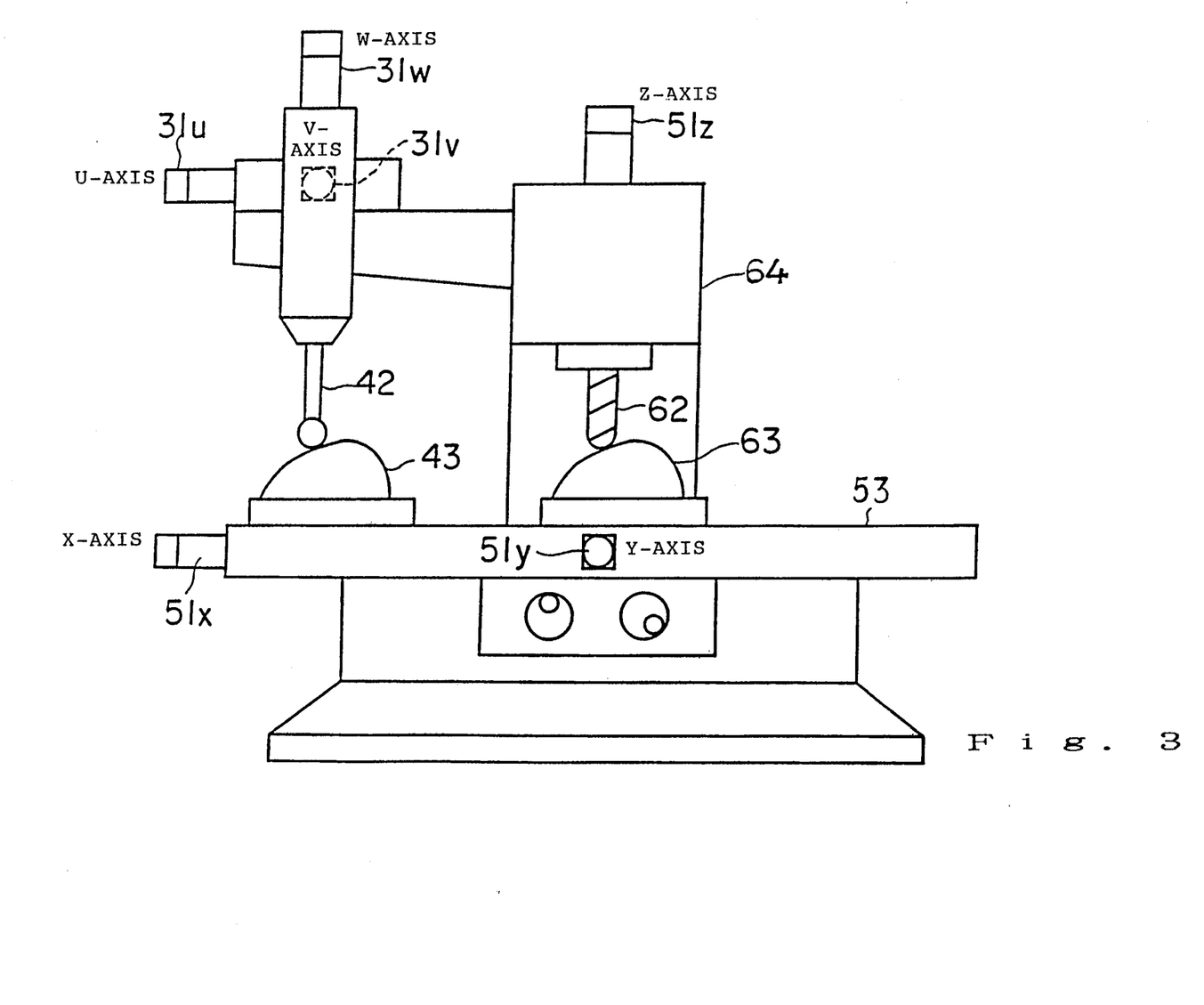
FIG. 3 is an elevational view of a tandem-type tracing machine.

FIG. 3 shows a tandem-type tracing machine by way of example.

In the tandem-type tracing machine, the cutter head 62 is mounted on a column 64, which is movable along the Z-axis by a Z-axis motor 51z. U-, V-, and W-axis motors 31u, 31v, 31w are supported on the column 64 for moving the tracer head 42 in respective axes in addition to the movement of the column 64. The model 43 and the workpiece 63 are fixedly mounted on a table 53, which is movable by the X- and Y-axis motors 51x, 51y.

Figure 4:
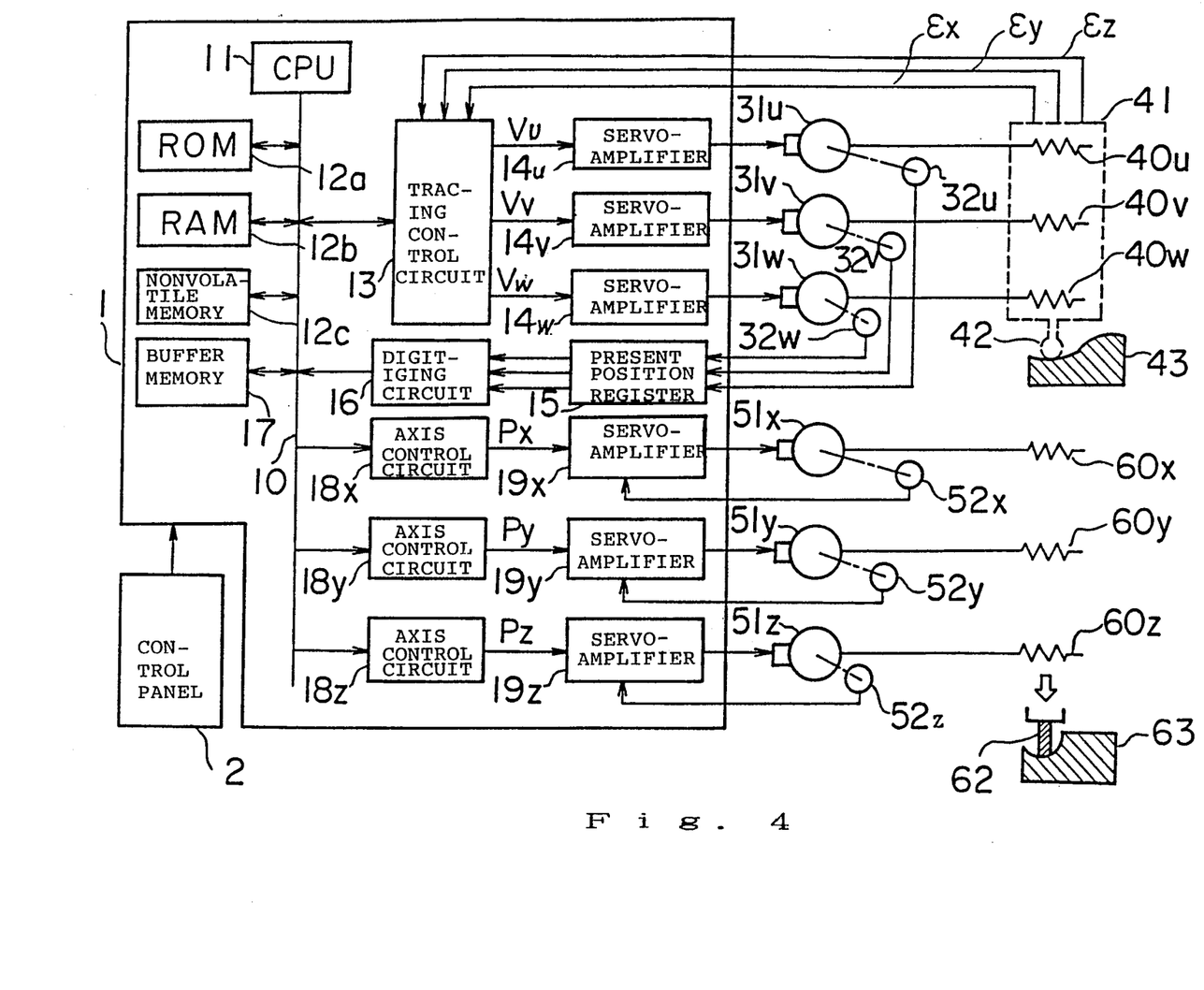
FIG. 4 is a block diagram of the hardware arrangement of the tracing control system.

FIG. 4 shows, in block form, the hardware arrangement of the tracing control system. In FIG. 4, the tracing control system has a processor ("CPU") 11 for reading a system program from a ROM 12a through a bus 10, and controlling the entire operation of the tracing control system 1 according to the system program. A RAM 12b, which comprises a DRAM, serves to store temporary calculation data and display data. A nonvolatile memory 12c is backed up by a battery (not shown), and stores various parameters, etc., required for tracing control, digitizing, and numerical control processes. These parameters can be entered from a control panel 2.

The tracing control system also has a tracing control circuit 13 which is supplied with displacements ϵx, ϵy, ϵz of the stylus 42 along the respective axes, and commanded by the processor 11 through the bus 10 with respect to a tracing plane, a tracing speed, etc., for generating shaft speed signals Vu, Vv, Vw for respective tracing shafts 40u, 40v, 40w in a known manner. Servoamplifiers 14u, 14v, 14w amplify the respective differences between the shaft speed signals Vu, Vv, Vw and the corresponding distances Vx, Vy, Vz to be traversed along respective X-, Y-, and Z-axes per unit time, and actuates the servomotors 31u, 31v, 31w mounted on the machine for moving the tracer head 41 along the U-, V-, and W-axes and thereby for movement along the surface of the model 43 for tracing control.

Pulse coders 32u, 32v, 32w generate pulse signals, as U-, V-, and W-axis position signals, each time the servomotors 31u, 31v, 31w rotate a predetermined angle. The tracing control system 1 has a current position register 15 for reversibly counting the pulse signals form the pulse coders 32u, 32v, 32w and storing the present positions of the tracing shafts 40u, 40v, 40w. The current position register 15 may store a corrected command position for the cutter center of the cutter head, and the workpiece may be machined after digitizing data has been produced through tracing operation.

The positional data stored in the current position register 15 is supplied to a digitizing circuit 16, which reads the supplied positional data at certain time intervals and generates NC data that linearly approximates the profile of the model 43. In the generation of NC data in the digitizing circuit 16, an error of the path due to a displacement of the stylus 42 is corrected. The digitizing circuit 16 determines an abrupt profile change when the positional data varies beyond a predetermined range and temporarily interrupts the reading of the positional data. The digitizing circuit 16 can also scale the positional data at a predetermined ratio, convert the unit of the positional data into another unit, and rotate the coordinates of the positional data according to an external command or a program. The generated NC data are stored into a buffer memory 17 through the bus 10.

When the NC data are stored in the buffer memory 17, the processor 11 reads the stored NC data, and applies the read data, as movement commands for machining shafts 60x, 60y, 60z, to axis control circuits 18x, 18y, 18z. The axis control circuits 18x, 18y, 18z convert the movement commands into respective position command signals Px, Py, Pz, which are supplied to respective servoamplifiers 19x, 19y, 19z. The servoamplifiers 19x, 19y, 19z amplify the supplied position command signals Px, Py, Pz to energize respective servomotors 51x, 51y, 51z.

The servomotors 51x, 51y, 51z have respective built-in position detecting pulse coders 52x, 52y, 52z for feeding position signals as pulse trains back to the servoamplifiers 19x, 19y, 19z. Although not shown, the servoamplifiers 19x, 19y, 19z convert the frequencies of the pulse trains into respective voltages to generate speed signals. Therefore, both position and speed feedback loops are implemented by the pulse coders 52x, 52y, 52z and the servoamplifiers 19x, 19y, 19z.

As a result, the cutter head 62 is moved according to the NC data to machine the workpiece 63 in conformity with the profile of the model 43.

Figure 5:
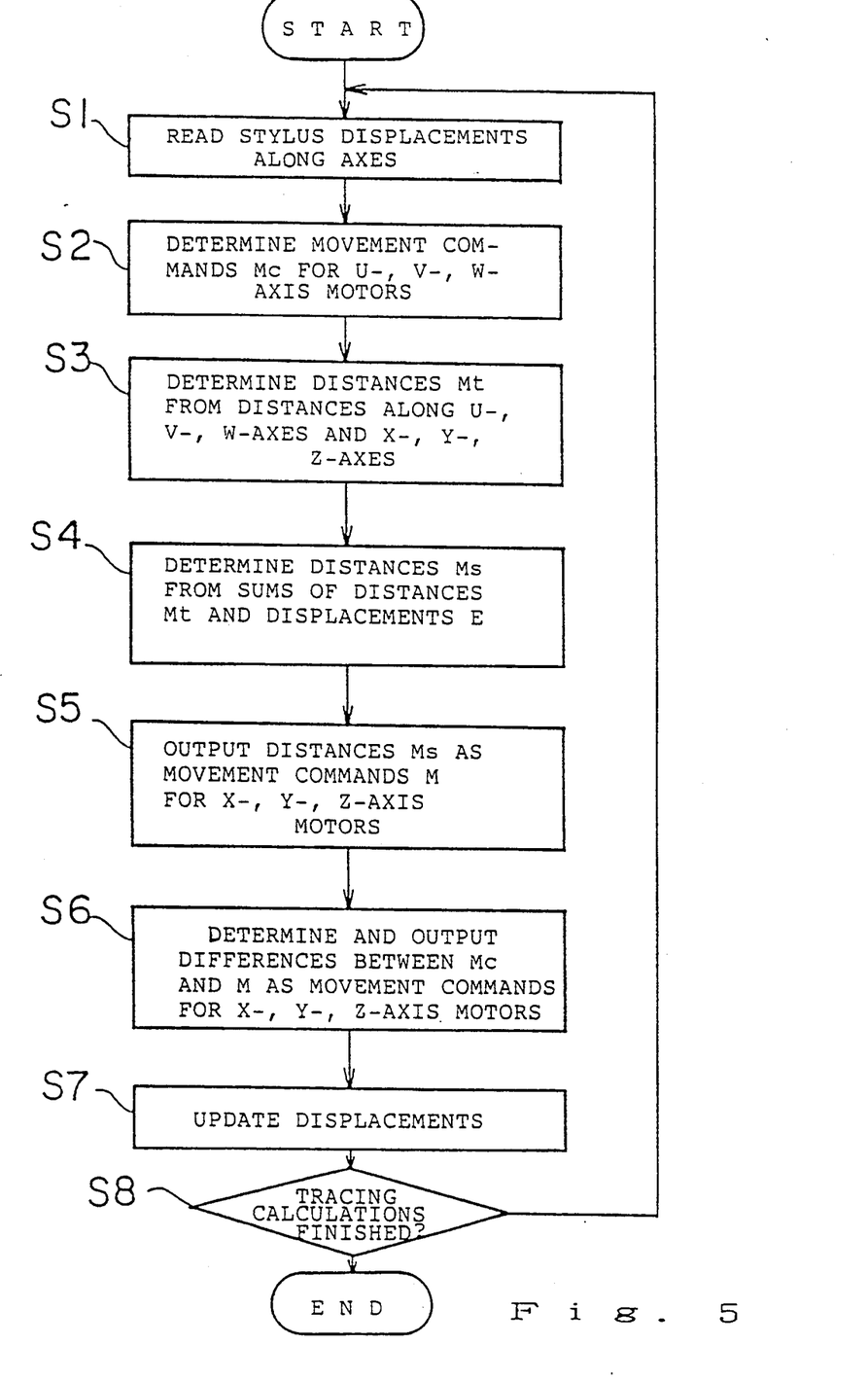
FIG. 5 is a flowchart of a control sequence of the tracing control system.

FIG. 5 is a flowchart of the control sequence of the tracing control system. In FIG. 5, numerals following the letter "S" represent step numbers. The control sequence shown in FIG. 5 is executed repeatedly at predetermined periodic intervals by processor 11 according to the system program stored in the ROM 12a.

[S1] Displacements ϵx, ϵy, ϵz of the stylus 42 along the respective axes are read from the tracer head 41.

[S2] Tracing calculations are carried out to determine movement commands Mc (Uc, Vc, Wc) for the U-, V-, and W-axis motors.

[S3] Within a unit calculating period, the sums of the distances to be traversed by the U-, V-, W-axis motors and the distances to be traversed by the X-, Y-, Z-axis motors are determined, thereby to calculate the distances Mt (Xt, Yt, Zt) traversed by the tracer head in the meantime.

[S4] Within a unit period, the sums of the distances Mt (Xt, Yt, Zt) traversed by the tracer head and axis displacements E (ϵx−ϵx0, ϵy−ϵy0, ϵz−ϵz0) are determined to calculate distances Ms (Xs, Ys, Zs) traversed by the central position of the stylus.

[S5] The calculated distances Ms (Xs, Ys, Zs) traversed by the central position of the stylus are outputted as movement commands M (X, Y, Z) for the X-, Y-, and Z-axis motors.

[S6] The differences between the movement commands Mc (Uc, Vc, Wc) along the U-, V-, and W-axis, determined by the tracing calculations in the step 2, and the movement commands m (X, Y, Z) for the X-, Y-, and Z-axis motors are determined, and outputted as movement commands (U, V, W) for the U-, V-, and W-axis motors.

[S7] The previous displacements (ϵx0, ϵy0, ϵz0) are updated into the displacements (ϵx, ϵy, ϵz).

[S8] It is determined whether the tracing calculations are finished or not. If not, the control sequence is executed again from the step 1.

In the above embodiment, the tracer head is used in the tandem-type tracing control system for tracing operation. However, a non-contact distance sensor corresponding to the tracer head may be used to control the cutter head to move along a path defined by correcting the displacement of the tracer head.

While the three control axes are used in each of the tracing and machining arrangements in the illustrated embodiment, the present invention is also applicable to other numbers of axes.

With the present invention, as described above, the cutter head is corrected in path and controlled into conformity with the central position of the stylus. Therefore, even when the tracer head overshoots with respect to the profile of the model, the cutter head is prevented from biting into the workpiece, and can accurately follow the profile of the model without reducing the tracing speed or interrupting the machining operation. Accordingly, the tracing control system can efficiently machine the workpiece while tracing the model in a machining process which requires a high degree of accuracy such as a finishing process.

What is claimed is:

1. A tracing control system for controlling the machining of a work piece by a cutter head which is movable along respective cutting axes of a first three dimensional coordinate system in accordance with tracing of a model by a tracer head having a stylus which contacts the model, the tracer head being movable selectively along respective tracing axes of a second three dimensional coordinate system and the stylus being displaceable, relatively to the tracer head and resultant from forces applied to the stylus by the model, said tracing control system comprising:

calculating means for calculating an actual position of the tracer head relative to the first three dimensional coordinate system;

cutter head actuating means for actuating the cutter head for selective movement along the respective cutting axes of the first coordinate system;

tracer head actuating means for actuating the tracer head for selective movement along the respective tracing axes of the second coordinate system, independently of movement of the cutter head within the first three dimensional coordinate system;

speed command supply means for supplying respective tracer head speed commands to the tracer head actuating means and cutter head speed commands to the cutter head actuating means, respectively defining the actuating thereby, and the resultant, corresponding movements of the tracer head and the cutter head;

stylus displacement detection means, associated with the tracer head, for detecting displacements of the stylus relatively to the tracing head along the respective tracing axes of the second coordinate system and producing corresponding displacement signals related to the respective tracing axes; and correcting means for correcting the cutter head speed commands in accordance with the displacement signals and for supplying the thus corrected cutter head speed commands to the cutter head actuating means thereby to actuate the cutter head for movement along the respective cutting axes of the first coordinate system in accordance with the corrected cutter head speed commands.

2. A tracing control system as recited in claim 1, wherein the respective tracing axes of the second three-dimensional coordinate system are aligned with the corresponding, respective cutting axes of the first three dimensional coordinate system and the cutter head and the tracer head have corresponding, initial reference positions in the respective, first and second three dimensional coordinate systems, the calculating means further comprising:

cutter head position detection means for detecting a current, actual position of the cutter head in the first three dimensional coordinate system based on the sum of distances through which the cutter head has been selectively moved, relative to the initial position thereof, along the respective cutting axes;

tracer head position detection means for detecting the current, actual position of the tracer head in the second three dimensional coordinate system based on the sum of distances through which the tracer head has been selectively moved, relative to the initial position thereof, along the respective tracing axes; and means for adding the current actual position of the tracer head to the current actual position of the cutter head and producing corresponding addition results defining the actual position of the tracer head relative to the first three dimensional coordinate system.

3. A tracing control system as recited in claim 2, wherein the cutter head actuating means is operable for actuating the cutter head for selective movement in tandem with the movement of the tracer head.

4. A tracing control system as recited in claim 1 wherein the respective tracing axes for the second three-dimensional coordinate system are aligned with the corresponding, respective cutting axes of the first three-dimensional coordinate system, the tracer head actuating means further comprising:

means for determining respective tracer head axis speed signals corresponding to the movement of the tracer head along the respective tracing axes of the second coordinate system, respective cutter head axis speed signals corresponding to movement of the cutter head along the respective cutting axes of the first coordinate system in accordance with the corrected cutter head speed commands, and the respective differences between the corresponding and respective tracer head axis speed signals and the cutter head axis speed signals and producing corresponding and respective axis speed difference signals and for supplying the respective axis speed difference signals to the tracer head actuating means.

5. A tracing control system as recited in claim 1, further comprising:

storage means for storing the corrected cutter head speed commands; and control means for controlling the calculating means, the tracer head actuating means, the speed command supply means, the stylus displacement detection means and the correcting means so as to complete the tracing of the model by the tracer head and thereby for producing, and supplying to the storage means for storage therein, corresponding, corrected cutter head speed commands for the complete machining of the workpiece and, thereafter, for controlling the speed command supply means to supply the stored, corrected cutter head speed commands from the storage means to the cutter head actuating means for the complete machining of the workpiece.

* * * * *

UNITED STATES PATENT AND TRADEMARK OFFICE
CERTIFICATE OF CORRECTION

PATENT NO. : 5,341,079
DATED : August 23, 1994
INVENTOR(S) : Hitoshi MATSUURA et al.

It is certified that error appears in the above-indentified patent and that said Letters Patent is hereby corrected as shown below:

COVER PAGE, [54] "TRACKING" should be --TRACING--.

Column 1, line 2, "TRACKING" should be --TRACING--.

Column 2, line 10, "approximately" should be

--approximated--.

Column 4, line 11, "motor" should be --motors--; and line 68, "form" should be --from--.

Column 6, line 58, "W-axis," should be --W-axes,--.

Signed and Sealed this

Twenty-ninth Day of November, 1994

Attest:

BRUCE LEHMAN

*Attesting Officer*     *Commissioner of Patents and Trademarks*